United States Patent
Dornwald et al.

(10) Patent No.: US 9,387,930 B2
(45) Date of Patent: Jul. 12, 2016

(54) STEALTH AERIAL VEHICLE

(75) Inventors: Jochen Dornwald, Munich (DE); Bartholomaeus Bichler, Raubling (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 1071 days.

(21) Appl. No.: 13/490,593

(22) Filed: Jun. 7, 2012

(65) Prior Publication Data

US 2015/0375862 A1 Dec. 31, 2015

(30) Foreign Application Priority Data

Jun. 8, 2011 (DE) .......... 10 2011 106 348

(51) Int. Cl.
| | |
|---|---|
| *G01S 13/88* | (2006.01) |
| *B64D 7/06* | (2006.01) |
| *B64D 7/00* | (2006.01) |
| *B64C 25/10* | (2006.01) |
| *B64C 39/02* | (2006.01) |
| *B64C 39/10* | (2006.01) |
| *B64D 1/06* | (2006.01) |
| *B64D 27/14* | (2006.01) |

(52) U.S. Cl.
CPC . *B64D 7/06* (2013.01); *B64C 25/10* (2013.01); *B64C 39/024* (2013.01); *B64C 39/10* (2013.01); *B64D 1/06* (2013.01); *B64D 7/00* (2013.01); *B64D 27/14* (2013.01); *B64C 2201/028* (2013.01); *B64C 2201/121* (2013.01); *B64C 2201/22* (2013.01)

(58) Field of Classification Search
CPC ............. B64D 7/00; H01Q 1/28; H01Q 15/18
USPC ........................................................ 342/2–3
See application file for complete search history.

(56) References Cited

U.S. PATENT DOCUMENTS

| | | | | |
|---|---|---|---|---|
| 5,250,950 | A * | 10/1993 | Scherrer | H01Q 17/00 342/13 |
| 6,129,308 | A | 10/2000 | Nastasi et al. | |
| 6,663,047 | B1 * | 12/2003 | Arata | B64D 1/06 244/137.1 |
| 2004/0144893 | A1 * | 7/2004 | Clark | B64C 1/0009 244/36 |

OTHER PUBLICATIONS

European Search Report dated Aug. 31, 2012 (six (6) sheets).
Koalorka, "F-117 Nighthawk Front", Feb. 10, 2008, XP 55036302A (four (4) sheets).
Davis, "B-2 Spirit Original", Feb. 7, 2007, XP 55036301A (five (5) sheets).
Moxon, "Dassault Unveils Stealthy UCAV", Flight International, Reed Business Information, Sutton Surrey, GB, bd. 158, nr. 4750, Oct. 10, 2000, p. 8, XP 000965826A (one (1) sheet).

* cited by examiner

*Primary Examiner* — Timothy A Brainard
(74) *Attorney, Agent, or Firm* — Crowell & Moring LLP

(57) ABSTRACT

An aerial vehicle having a low radar signature includes a first side on which turbine openings, and payload bays or landing gear bays are disposed. A second side of the aerial vehicle is designed to have a smaller radar signature than the first side.

11 Claims, 3 Drawing Sheets

STEALTH AERIAL VEHICLE

FIELD OF THE INVENTION

The invention relates to an aerial vehicle, in particular, a stealth aircraft, and to a method of operating an aerial vehicle.

BACKGROUND OF THE INVENTION

Aircraft and other aerial vehicles are frequently monitored by radar equipment. Aerial vehicles having a low radar signature have been developed to evade this monitoring, i.e., aerial vehicles that, for example, radiate back radar waves only at a low level in the direction of the radar equipment.

A low radar signature, which is the equivalent of a low probability of the aerial vehicle's being detected by radar, can be implemented or at least enhanced, for example, by energy-absorbing paints, energy-diverting seals for the outer-skin joints, fewer and larger hinged flaps for maintenance instead of many small ones, accommodating loads within interior shafts instead of having exterior loads.

Ninety percent of the improvement, i.e., the reduction in the radar signature of an aerial vehicle, currently occurs by improving the geometry of the aerial vehicle. This can be effected, for example, by reducing edge reflections whereby the edges are, for example, parallelized.

Examples of stealth aerial vehicles having an extremely low radar signature include the strategic long-range bomber Northrop B-2, and the unmanned aircraft Boeing X-45 and Northrop X-47.

In aerial vehicles having an extremely low radar signature, any disturbances in the aircraft surface can generate unwanted radar back-scattering. These disturbances can include, specifically, engine intakes and nozzles, as well as landing gear and weapons bay doors, the stealth concealment of which can entail a significant cost even when in the closed state.

SUMMARY OF THE INVENTION

Exemplary embodiments of the present invention are directed to an aerial vehicle, the stealth properties of which are especially difficult to overcome by radar beams.

A first aspect of the invention relates to an aerial vehicle. The aerial vehicle may, for example, be a manned aircraft or a UAV, i.e., an unmanned aerial vehicle.

In one embodiment of the invention, the aerial vehicle comprises at least one turbine or at least one engine to propel the aerial vehicle. The turbine here has at least one turbine opening. For example, the turbine can comprise at least one air intake and at least one nozzle opening.

In addition, the aerial vehicle comprises at least one bay or a plurality of bays. Additional components of the aerial vehicle can be accommodated by the bay(s) inside the aerial vehicle. These components can include a landing gear, payload, weapon, or releasable missile, such as, for example, a bomb. A bay can be understood here to refer to a (closable) opening in the aerial vehicle that can be closed, for example, by a hinged flap or a door. A bay can in other words be closed by a hinged flap. Bays of this type can include a landing gear bay, a payload bay, or a weapons bay.

In one embodiment of the invention, the aerial vehicle is designed to have a low radar signature. Radar signature is understood here to refer to the property of the aerial vehicle whereby incident radar waves from one direction are reflected in the same direction. The radar signature can also be described as the radar cross-section (RCS). A small radar cross-section here means poor detectability by radar waves.

When the following and previous discussion refer to stealth properties or a stealth surface or stealth side, this is understood to refer to the fact that the relevant surface has a low radar signature. As has already been explained above, a low radar signature can be achieved by the geometry of the aerial vehicle and by a radar-absorbing material, such as a paint, applied to the surface. In other words, the aerial vehicle can be stealth aerial vehicle in terms of radar waves.

In one embodiment of the invention, the at least one turbine opening and the at least one bay are disposed on a first side of the aerial vehicle, while a second side of the aerial vehicle is designed to have a lower radar signature than the first side. For example, all of the openings and bays can be located on the first side, while the second side can be free of openings and bays. This enables the second side to have optimal stealth properties.

Based on the premise that the aerial vehicle generally turns the second (high-stealth) side towards a threat, it is not necessary for the first side to have exactly the same degree of stealth. This allows high stealth properties to be dispensed with for the openings and the bays.

Positioning the sources of disturbance, such as openings and bays, on the side opposite the threat achieves the result that these sources of disturbance are no longer directly exposed to the radar waves from the direction of the threat, and therefore no longer have to undergo costly stealth treatment. In other words, all or many of the openings detrimental to RCS can be positioned on one side of the aerial vehicle in order to further minimize a radar signature in aerial vehicles having an extremely low signature.

Configurational optimization of disturbance sources, i.e., openings and bays, of the aerial vehicle thus enables its radar signature to be optimized in a specific direction.

In one embodiment of the invention, the second side has an essentially undisturbed or smooth surface. In particular, the second side can be designed without indentations, protrusions, and edges. This approach enables a "clean", especially high-stealth (second) side to be created without any disturbances in the surface. This can be achieved in terms of configuration by positioning cavities, such as intakes, nozzles, landing gear bays, and/or weapons bays, on the opposite (first) side—in particular, those cavities that are open or are to be opened in flight. Based on the freely selectable attitude in flight, the aerial vehicle can thus always orient the clean second side towards the radar threat (for example, ground-based radar) and thereby optimize the stealth properties. The cost of minimizing radar backscatter due to secondary scattering centers, such as, for example, openings and bays, can thus be reduced by disposing these scattering centers on the first side of the aerial vehicle.

In one embodiment of the invention, the second side does not have any bays. If, for example, the landing gear bays and payload or weapons bays are disposed on the same (first) side as the engine openings, the second side is then relatively free of larger openings and can thus be provided especially easily with stealth properties.

In one embodiment of the invention, the first side includes all of the bays and openings. This makes it possible for the first side not to have any openings that would have to be given stealth properties.

In one embodiment of the invention, a bay is a landing gear bay or a payload bay. For example, all of the landing gear bays can be placed on the first side on which the engine openings are also located. The payload and weapons bays can also be located on the first side. In particular, the landing gear bays, payload bays, and/or weapons bays can be placed on the top side of the aerial vehicle. This may mean that the aerial vehicle has to turn over in order to release the payload, use the weapon, land, or take off.

In one embodiment of the invention, the first side is a top side of the aerial vehicle and/or the second side is a bottom side of the aerial vehicle. The aerial vehicle can, for example, be a flat flying body that extends significantly further in the longitudinal and transverse axes than in a vertical axis. In this case, the first and the second side can be respectively the top and the bottom side of the aerial vehicle. The top or the bottom side of the aerial vehicle here can be characterized by the orientation of the pilot or by technical limitations, such as, for example, the preferred attitude. If the first side is the top side, the pilot can, for example, fly in the upright position with the stealth second side facing down.

In one embodiment of the invention, the aerial vehicle is designed preferably to fly in an attitude in which the second side is oriented in the main threat direction. The main threat direction can be determined, for example, by a radar unit on the ground; thus points towards the ground. For example, the aerodynamic shape of the aerial vehicle can be designed to have the greatest lift in the preferred attitude.

In one embodiment of the invention, only the second side of the aerial vehicle can be detected from one viewing direction. In other words, from one viewing direction the second side completely hides the first side of the aerial vehicle.

As a result, a radar unit that beams radar waves in the viewing direction of the aerial vehicle could only detect the second side. Since the second side has especially effective stealth properties, the aerial vehicle is able to remain invisible to the radar unit despite the fact that it is clearly possible that the radar unit would be capable of detecting the first side.

In particular, the first and the second sides can be situated opposite each other. It is also possible for only the first side to be detected from another viewing direction.

In one embodiment of the invention, the aerial vehicle includes a cockpit. The aerial vehicle can thus be a manned aerial vehicle. The cockpit can be disposed on the first side. A cockpit, and especially the dome of the cockpit, can generate unwanted radar signatures. In this case, it may be possible for the pilot to be upside-down in the aerial vehicle during landing, takeoff, and when using the payload or weapons bays.

In one embodiment of the invention, the aerial vehicle is designed for unmanned operation. The aerial vehicle requires for this purpose an onboard computer that is capable of flying the aerial vehicle independently. The configurations of openings and bays described both above and below may be of interest specifically for unmanned aerial vehicles since the physiognomy of the pilot then does not have to be taken into account.

In one embodiment of the invention, the aerial vehicle is designed as a flying wing. A flying wing here can be an aerial vehicle that has a fuselage and wing body. In other words, in a flying wing the wings cannot be distinguished visually from the fuselage. A flying wing configuration, which can be provided very effectively with stealth properties, and has a first and a second side such as described both above and below, can be deployed, for example, against enemy air defense means.

Another aspect of the invention relates to a method of operating an aerial vehicle, in particular, an aerial vehicle such as that described above and below.

In one embodiment of the invention, the method comprises the steps: flying in an attitude in which a second side of the aerial vehicle faces in the direction of a threat, for example, downward, while the second side is opposite a first side of the aerial vehicle on which nozzle openings and a payload bay of the aerial vehicle are placed; switching to an attitude in which the first side faces the direction of the threat; releasing a payload from the payload bay. The payload bay can be opened before releasing the payload. After releasing the payload, the payload bay can be closed again.

Following this, the aerial vehicle can switch back to the attitude in which the second side faces the direction of the threat. This approach enables the radar signature of the aerial vehicle to be very low in the direction of the threat during the majority of the time of flight. Only when releasing the payload does the aerial vehicle turn its first side, the side with weaker stealth properties that the second side, towards the threat.

In one embodiment of the invention, the method comprises the steps: taking off in the attitude in which the first side faces down; retracting a landing gear into a landing gear bay that is placed on the first side; switching to the attitude in which the second side faces the direction of the threat; switching to an attitude in which the first side faces down; extending the landing gear; landing in the attitude in which the first side faces down. In other words, the aerial vehicle can be designed to land and take off on its back. In order to land and take off, the aerial vehicle can in other words rotate into a position in which the side with the landing gear points down (i.e., towards the ground). Strong stealth properties are generally not required during takeoff and landing.

The following discussion describes exemplary embodiments of the invention in detail with reference to the attached figures.

Figure 1:
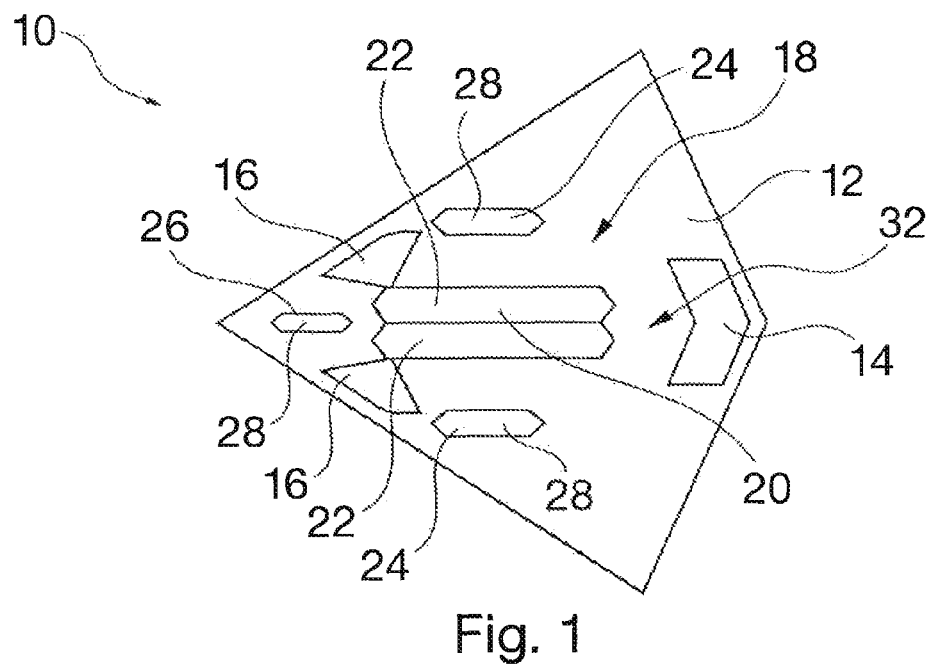
FIG. 1 is a schematic view of the first side of an aerial vehicle based on one embodiment of the invention.

The reference numerals used in the figures and their meanings are provided in summary form in the list of reference numerals.

As a rule, identical or similar components are provided with identical reference numerals.

DETAILED DESCRIPTION OF EXEMPLARY EMBODIMENTS

Figure 2:
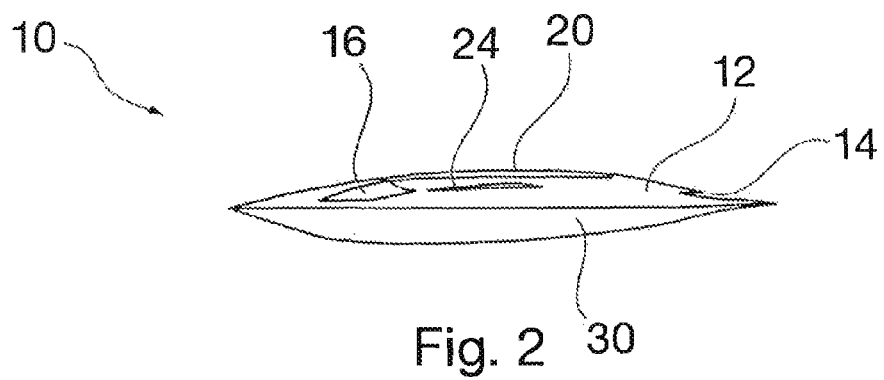
FIG. 2 is a schematic view of the narrow side of the aerial vehicle in FIG. 1.
Figure 3:
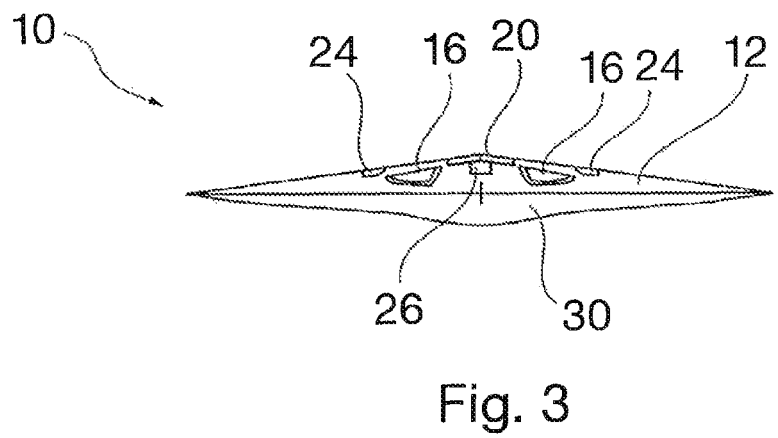
FIG. 3 is a schematic view from the front of the aerial vehicle in FIG. 1.
Figure 4:
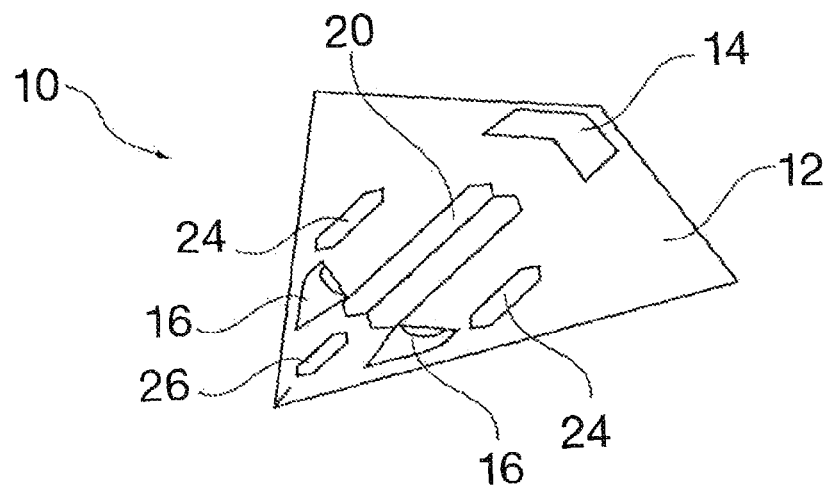
FIG. 4 is a schematic view of the first side of the aerial vehicle in FIG. 1 as seen obliquely from above.

FIGS. 1 through 4 depict aerial vehicle 10 from different directions. FIG. 1 provides a view of the first side 12; FIG. 2 provides a view of the narrow side; FIG. 3 provides a view from the front; while FIG. 4 provides a view of first side 12 as seen obliquely from above.

Aerial vehicle 10 is a flying-wing aircraft having an essentially trapezoidal fuselage. On first side 12, a nozzle opening 14 is located at the back end, while two intakes 16 are located at the front end that are disposed symmetrically relative to a center axis of aerial vehicle 10. A turbine 18 is located in aerial vehicle 10 in order to propel it, which turbine can draw in air through intakes 16, compress it, and eject it through nozzle openings 14. Intakes 16 and nozzle openings 14 are turbine openings of aerial vehicle 10.

A payload bay 20 is located on first side 12, which bay is closed by two hinged flaps or doors 22. The payload bay is disposed symmetrically relative to the center axis, and between intakes 16 and nozzle opening 14. Two main landing gear bays 24 are disposed relative to the center axis adjacent to payload bay 20, while a nose landing gear bay 26 is disposed ahead of payload bay 20 between both intakes 16. Landing gear bays 24 and 26 are closed by hinged flaps or doors 28.

FIGS. 2 and 3 also reveal a second side 30 of aerial vehicle 10 that is opposite first side 12. The entire surface of the aerial vehicle is formed by the two sides 12 and 14. Turbine openings 14, 16, and bays 20, 24, 26, and thus all of the openings here, are disposed on first side 12.

No turbine openings or bays are located on second side 30. Second side 30, in particular, has no openings but rather a completely undisturbed, smooth surface that exhibits a very low radar signature. The low radar signature of second side 30 that is determined the side's geometry can be reduced even further by means of an appropriate coating. In particular, it can be significantly smaller than the radar signature of first side 12. As is evident in FIG. 3, second side 30 has a surface that is slightly curved towards the center.

The figures depict unmanned aerial vehicle 10 that is designed as a flying wing. However, it is also possible for a similar manned aerial vehicle to have this type of configuration of turbine openings 14, 16, and bays 20, 24, 26. In this case, a cockpit 32, for example, could be disposed on first side 12.

FIGS. 1 through 4 and FIG. 7 depict the aerial vehicle in a cruise flight attitude in which side 12 faces up while second side 30 faces down. In a manned aerial vehicle, the top side and the bottom side of the aerial vehicle can be defined by the orientation of the pilot. As a result, first side 12 can be a top side of aerial vehicle aerial vehicle 10 while second side 30 can be a bottom side of aerial vehicle 10.

Figure 5:
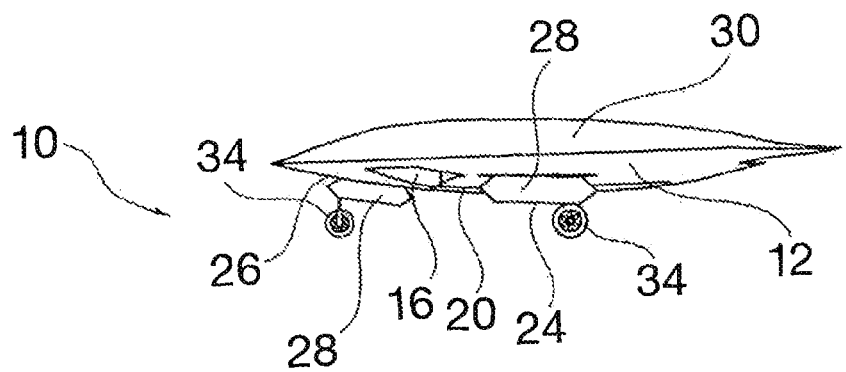
FIG. 5 is a schematic view of the aerial vehicle in FIG. 1 when operating on the ground.
Figure 6:
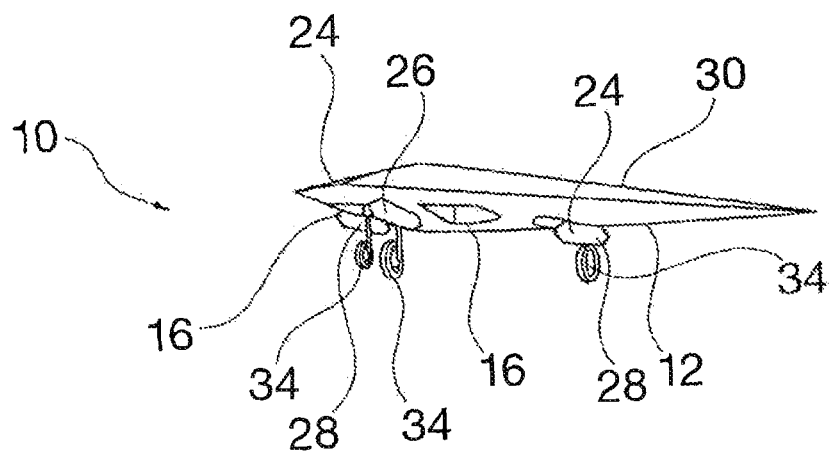
FIG. 6 is a schematic view of the aerial vehicle in FIG. 1 during takeoff.
Figure 7:
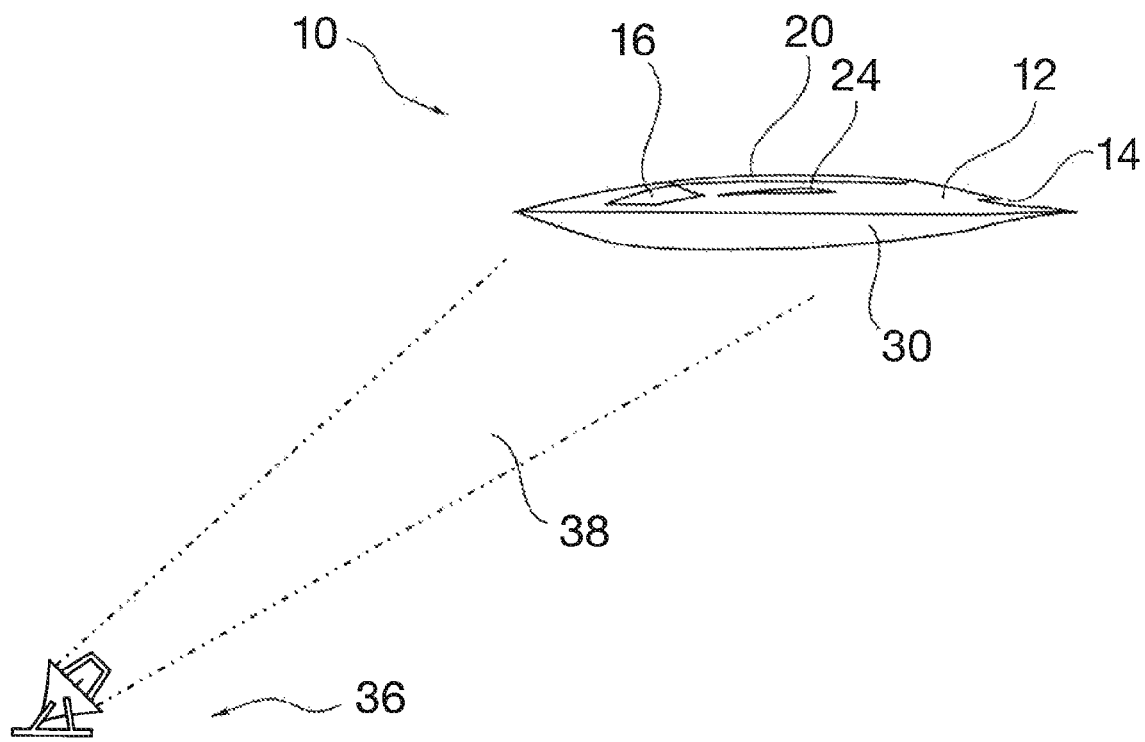
FIG. 7 is a schematic view of the aerial vehicle in FIG. 1 when in the cruise flight attitude.

FIGS. 5 through 7 illustrate the operation of aerial vehicle 10.

FIG. 5 depicts aerial vehicle 10 on the ground. Landing gear hinged flaps 28 have been opened and landing gear 34 extended. First side 12 faces down. Second side 30 faces up.

FIG. 6 depicts aerial vehicle 10 during takeoff. First side 12 also faces down during takeoff. After takeoff, landing gear 34 is retracted into landing gear bays 24, 26, and aerial vehicle 10 switches to an attitude in which second side 30 faces in the direction of a threat.

A threat of this type is depicted in FIG. 4 in the form of a radar unit 36. Since radar unit 36 is located on the ground while aerial vehicle 10 is the air, the threat comes from below and second side 30 faces down.

Only second side 30 of aerial vehicle 10 is visible from the viewing direction of radar unit 36. Radar waves 38 that are emitted by radar unit 36 in the direction of the aerial vehicle impinge only on second, high-level-stealth side 30 and are either absorbed by this side or scattered away from radar unit 36.

Figure 8:
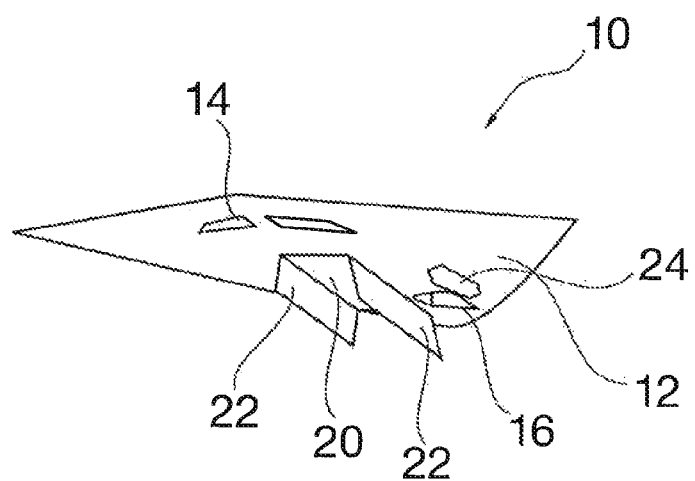
FIG. 8 is a schematic view of the aerial vehicle in FIG. 1 with payload bay open.

Aerial vehicle 10 switches to an attitude, such as that depicted in FIG. 8, in order, for example, to drop or fire a weapon at threat 36. First side 12 points towards threat 36 in this attitude. In this attitude, payload bay 20 can be opened and the payload, in the form of a bomb or rocket, can be released. Payload bay 20 is then closed. To be sure, aerial vehicle 10 can be detected more readily when in this attitude. However, it only has to remain in this attitude for a short time.

After using payload bay 20, aerial vehicle 10 switches back into an attitude, such as that depicted in FIG. 7. After returning home, aerial vehicle 10 switches again into the attitude depicted in FIG. 6, extends the landing gear, and lands.

It must be added that "comprising" does not exclude any other elements or steps, while "a/an" or "one" do not exclude a plurality. It must furthermore be stated that the features or steps that have been described with reference to one of the above exemplary embodiments can also be applied in combination with other features or steps of other exemplary embodiments described above. Reference numerals in the claims must not be viewed as constituting a restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 10 aerial vehicle
12 first side
14 nozzle opening
16 air intake
18 turbine
20 payload bay
22 hinged flap
24 main landing gear bay
26 nose landing gear bay
28 hinged flap
30 second side
32 cockpit
34 landing gear
36 radar unit
38 radar waves

What is claimed is:
1. An aerial vehicle, comprising:
at least one turbine configured to propel the aerial vehicle, the at least one turbine including at least one turbine opening; and
at least one landing gear bay configured to accommodate a landing gear of the aerial vehicle inside the aerial vehicle,
wherein the aerial vehicle has a low radar signature,
wherein the at least one turbine opening and the at least one landing gear bay are disposed on a first side of the aerial vehicle,
wherein a second side of the aerial vehicle has a smaller radar signature than the first side, and
wherein the second side has no bays.
2. The aerial vehicle according to claim 1, wherein the second side has an essentially undisturbed surface.
3. The aerial vehicle according to claim 1, wherein the first side includes all bays and openings of the aerial vehicle.
4. The aerial vehicle according to claim 1, wherein the at least one bay is closable by a hinged flap.
5. The aerial vehicle according to claim 1, wherein the first side is a top side of the aerial vehicle and the second side is a bottom side of the aerial vehicle.
6. The aerial vehicle according to claim 1, wherein the aerial vehicle is configured to fly in an attitude in which the second side is oriented in a main threat direction.

7. The aerial vehicle according to claim 1, wherein the aerial vehicle further comprises at least one payload bay disposed on the first side of the aerial vehicle.

8. The aerial vehicle according to claim 1, wherein from one viewing direction only the second side of the aerial vehicle can be detected.

9. The aerial vehicle according to claim 1, further comprising:
a cockpit, wherein the cockpit is disposed on the first side.

10. The aerial vehicle according to claim 1, wherein the aerial vehicle is configured for unmanned operation.

11. The aerial vehicle according to claim 1, wherein the aerial vehicle is configured as a flying wing.

* * * * *